April 12, 1932.  J. B. J. A. VIGNERON ET AL  1,853,524
MANUFACTURE OF FISHING NETS
Filed April 16, 1929
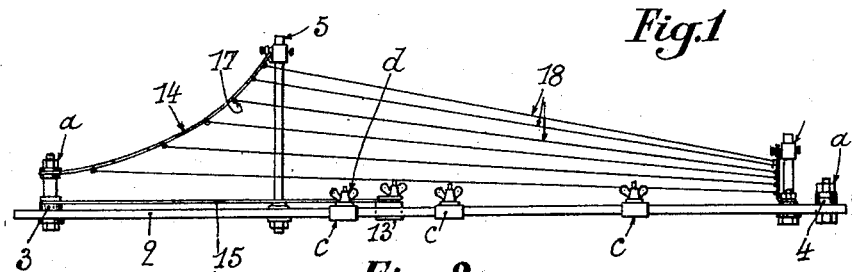
INVENTORS:
Jean-Baptiste Joseph Alphonse Vigneron
Paul Henri Fichoux
BY: Ruey, Boyer & Bakeler
ATTORNEYS.

Patented Apr. 12, 1932

1,853,524

UNITED STATES PATENT OFFICE

JEAN BAPTISTE JOSEPH ALPHONSE VIGNERON, OF LA ROCHELLE, AND PAUL HENRI FICHEUX, OF BOULOGNE-SUR-MER, FRANCE; SAID VIGNERON ASSIGNOR TO V. D. LIMITED, OF LONDON, ENGLAND

MANUFACTURE OF FISHING NETS

Application filed April 16, 1929, Serial No. 355,651, and in France May 7, 1928.

The invention relates to the manufacture of large fishing nets such as those used in trawl fishing, and more particularly to a skeleton frame adapted to represent on a small scale the fishing net to be constructed and on which the necessary measurements may be made.

It has already been proposed to employ for the manufacture of fishing nets of a determined type, a skeleton frame which reproduces on a small scale the general outline of the net, and upon which the various dimensions to be given to the different parts or pieces of netting of the net may be readily measured. However, this apparatus corresponds only to a single type of net, and only permits the construction of identical nets.

If the net manufacturer or the ship owner desires to make a change in the type of the net in use, or to design a new type, a new skeleton frame must be provided for the purpose, and this represents a great expense and a loss of time.

In practice, the nets to be manufactured offer considerable differences according to the power of the trawler, the different varieties of fish to be captured, the height at which the net is to operate (on the ground, at the surface, or in submerged condition), and other factors.

It is thus evident that a net manufacturer who is obliged to comply with the demands of his various customers in the fishing trade and is thus occupied with continual improvements in the form of the nets, as well as the ship-owner who possesses boats of different tonnages adapted for various fishing operations, should be provided with an apparatus which can be readily transformed in such manner as to correspond to a great variety of nets, and the manufacturer or ship owner will be thus enabled to study the different modifications required for a given net, and also to devise new types, and in all cases, to rapidly determine the shape and size of the parts of the net which is to be manufactured.

The present invention has for its object to provide an apparatus adapted to comply with the above requirements.

In the accompanying drawings, which are given by way of example:

Fig. 1 is a diagrammatic elevational view of an apparatus according to the invention.

Fig. 2 is a corresponding plan view.

Fig. 3 is an end view.

Fig. 4 is a cross section on the lines 4—4 of Fig. 2.

Figs. 5 to 8 show various details of construction.

In the form of construction shown in the drawings, the apparatus comprises a rigid adjustable skeleton or frame which represents on a small scale a longitudinal half of the net. Obviously, the apparatus may also correspond to the entire net, but a longitudinal half will generally serve the purpose in view.

Said apparatus comprises a horizontal bar 1 corresponding to the longitudinal axis of the net, a horizontal bar 2 inclined from the first and corresponding to the usual side rope, or to the lateral outline of the net in plan view, the two bars being connected together by two parallel spacing members or cross members 3, 4. These different bars and cross members are slotted and are secured together by bolts and nuts $a$, the slots affording the desired changes in the angle between the two bars 1 and 2, and in the distance between bars 1 and 2 and cross members 3 and 4. Upon the bar 1 is mounted an upright post 5 which is slidable in the slot of said bar and can be held in position by suitable means, for instance by a nut $b$ (Fig. 3). A similar upright post 6 of less height is disposed at the other end of said bar and is slidable on the same. Upon the respective upright posts are mounted sleeve 7 (Fig. 6), each provided with a set screw 8 and a screw operated hook 9. Upon the inclined bar 2 are slidably mounted measuring bars 10, 11, 12 secured to slides or cursors $c$ (Fig. 2) which are provided with set screws $d$. Between the uprights 5—6, the bar 1 carries a slide or cursor 13 provided with a screw operated hook $13^a$.

At the point of junction of the inclined bar 2 and the cross member 3 may be secured one end of a deformable rod 14, consisting of iron wire, for example, whose other end may be engaged in the hook 9 of the sleeve 7 mounted on the upright 5. The said rod corresponds to the head rope of the net which is to be manufactured, and it may be bent into any suitable curve. A similar rod 15, also of iron wire, may be secured at the said point of junction at one end, its other end being secured by the hook $13^a$ of the slide 13. The said rod corresponds to the ground rope of the net, and it can be bent into the proper shape. A socket 16 of suitable height is mounted on the bolt $a$ and spaces the ends of the rods 14—15 at the proper distance, corresponding to the height of the spreading slat or otterboard.

Rods 14 and 15 may be provided with hooks 17 for attaching a number of strings 18 whose other ends are attached to the hooks of a rod 19, which may be bent into any suitable shape and is mounted in like manner at the right hand end of the structure, between the inclined bar 2 and the small upright 6. It will be noted in Figures 1 and 2 that the apparatus thus provided with its strings stretched along the frame will represent on a small scale the general external shape of the net to be constructed.

The said apparatus is utilized in the following manner:

The inclination between the bars 1 and 2, and the distance between the uprights 5 and 6 are first adjusted. The rods 14, 15 and 19 corresponding to the head rope, ground rope and rear end of the net, are then properly curved into shape; the strings 18 are stretched between the corresponding hooks 17 of said rods. The bars 10, 11, 12 are now displaced along the inclined bar 2, so that the distances can be measured perpendicularly to said bar. It should be observed that the dimensions of the pieces of netting are usually determined by taking one of the side ropes or the lateral outline of the net as a base, and by making the measurements perpendicularly thereto. Further, by measuring the corresponding heights of the strings above the horizontal plane, this will afford all necessary data for properly shaping the different parts of the net, and the numbers of meshes can thus be accurately determined.

Obviously, the said apparatus is susceptible of numerous modifications in its form and construction; for instance, the rods 14, 15, 19 representing respectively the head rope, the ground rope and the outline of the rear pocket, may consist of flexible wooden bars or rods.

Instead of using slotted bars to constitute the horizontal frame, provision may be made of solid or tubular elements, of the type shown in Fig. 8; in this case, suitable collars 20 are mounted on the tubes and are provided with set screws 21. The adjustable junction between the elements is made for instance by means of double sleeves 22 provided with set screws.

Nets having a great variety of forms may thus be constructed, since it is feasible to change the length of the net, its spread in width, its bulging in height, the length of the head rope, and the like.

In the drawings, it is supposed that the apparatus is to be used for the manufacture of a ground trawling net which is to be dragged upon the ground, but it may obviously be employed for nets adapted to operate in submerged floating condition, and in this event, since the lower sheet of the net is bulged out below the horizontal plane, the apparatus may comprise vertical uprights extending below this horizontal plane. A second apparatus may also be used, which represents the lower part of the net, below the side cables, the net appearing in the inverted position.

The measurements can be made by means of a tape line, or by rigid graduated bars slidable on the movable measuring bars 10, 11, 12, or upon the cross members 3 and 4, or the like.

The various parts may carry graduated scales, as shown in Figures 6 and 8.

The upper cord 18 representing the upper outline of the net in vertical projection may be replaced by a deformable rod consisting of iron wire, which may be curved into the proper shape.

Iron wires may also be substituted for the strings 18, and the wires or strings may optionally rest upon one or more intermediate adjustable cross members, similar to the member 19, representing the rear pocket. The strings may also be replaced by elastic cords.

To render the different parts of the apparatus accessible, and in particular the nuts of the bolts $a$ and the nuts $b$, the apparatus is preferably mounted upon a pair of trestles or upon a table provided with supporting cleats.

Having now described our invention what we claim as new and desire to secure by Letters Patent is:

1. An adjustable skeleton frame for use in the manufacture of fishing nets, comprising a number of frame members, means for adjustably connecting said frame members with each other whereby said frame is adapted to represent at a smaller scale a portion at least of a fishing net of the desired shape, one of said frame members representing substantially the lateral outline of one side of the net in plan view from the net rear pocket to the forward outer edge, and measuring members perpendicular to said last mentioned member and movable along the latter.

2. An adjustable skeleton frame as claimed in claim 1, which further comprises a deformable member representing a portion at least of one of the ropes bounding the net mouth.

3. An adjustable skeleton frame as claimed in claim 1, which further comprises a deformable member representing a portion at least of the head rope.

4. An adjustable skeleton frame as claimed in claim 1, which further comprises a deformable member representing a portion at least of the cross-section of a rear portion of the net.

5. An adjustable skeleton frame as claimed in claim 1, which further comprises a deformable member representing a portion at least of one of the ropes bounding the net mouth, a deformable member representing a portion at least of the cross-section of a rear portion of the net, and deformable means adapted to be connected with and stretched between said deformable members.

6. An adjustable skeleton frame for use in the manufacture of fishing nets, comprising a first rigid member representing the longitudinal axis of the net, a second rigid member representing substantially the lateral outline of one side of the net in plan view from the net rear pocket to the forward outer edge, spacing members for adjustably connecting said rigid members, a vertical post of adjustable position along said first rigid member, an attaching member of adjustable position along said post, a deformable member connected with said attaching member, and representing a portion of a rope bounding the net mouth, means of adjustable position along said second rigid member for attaching the end of said deformable member, a deformable member representing a portion of the cross-section of the rear pocket, means for connecting said latter member to said rigid members and deformable means connected to and stretched between said deformable members.

7. An adjustable skeleton frame as claimed in claim 1, which further comprises a deformable wire representing a portion at least of one of the ropes bounding the net mouth.

8. An adjustable skeleton frame as claimed in claim 1, which further comprises a deformable wire representing a portion at least of one of the ropes bounding the net mouth, a deformable wire representing a portion at least of the cross-section of the rear pocket, hooks spaced along said wires, and strings adapted to be attached to corresponding hooks of said wires.

9. An adjustable skeleton frame as claimed in claim 1, wherein a number of said rigid frame members have measuring scales associated therewith.

10. An adjustable skeleton frame as claimed in claim 1, wherein a number of said rigid frame members are made of slotted bars, some of said connecting means slidably engaging two slots of adjacent bars.

In testimony whereof we have signed our names to this specification.

JEAN BAPTISTE JOSEPH ALPHONSE VIGNERON.
PAUL HENRI FICHEUX.